No. 836,600. PATENTED NOV. 20, 1906.
J. A. McMANUS.
APPARATUS FOR GENERATING POWER FROM WAVES.
APPLICATION FILED OCT. 28, 1905.
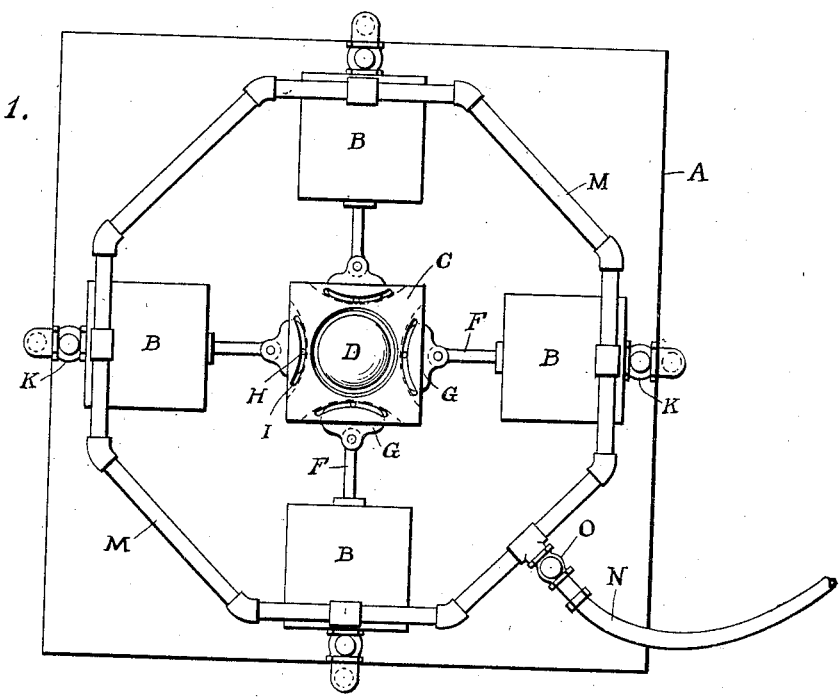
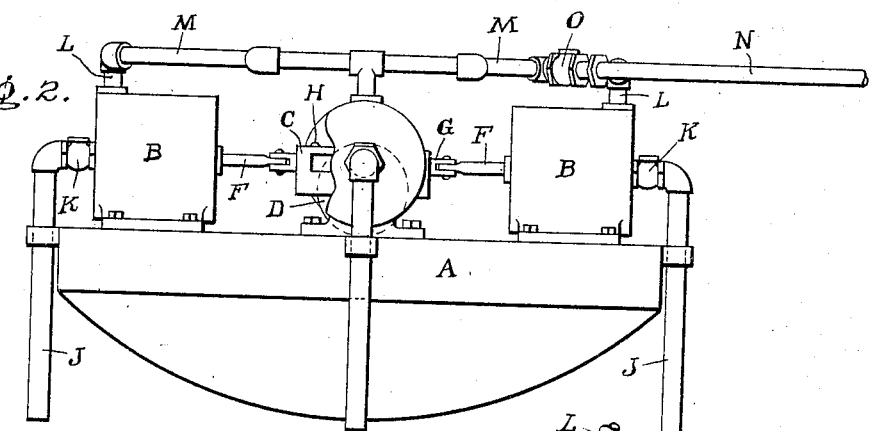
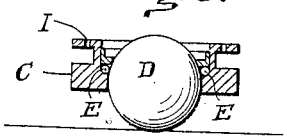
WITNESSES:
D. Webster, Jr.
J. Williamson
INVENTOR
John A. McManus
By W. Preston Williams
Attorney

UNITED STATES PATENT OFFICE.

JOHN A. McMANUS, OF PHILADELPHIA, PENNSYLVANIA.

APPARATUS FOR GENERATING POWER FROM WAVES.

No. 836,600.   Specification of Letters Patent.   Patented Nov. 20, 1906.

Application filed October 28, 1905. Serial No. 284,790.

*To all whom it may concern:*

Be it known that I, JOHN A. MCMANUS, a citizen of the United States, residing at Philadelphia, county of Philadelphia, and State of Pennsylvania, have invented a certain new and useful Improvement in Apparatus for Generating Power from Waves, of which the following is a specification.

My invention relates to a new and useful improvement in apparatus for generating power from waves, and has for its object to provide a simple and effective device of this description by which every motion of a float will be utilized to compress air or elevate water, which may thereafter be used for running various classes of machinery.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a plan view of my improved apparatus; Fig. 2, a side elevation of the same; Fig. 3, a detail view of the weight and ball-bearings upon which it is mounted; Fig. 4, an elevation of a portion of the float and one cylinder of a slightly-modified form of my improvement.

In the drawings, A represents a float which may be of any description or size, preferably round-bottomed, in order that it may readily oscillate in response to the action of the waves, and upon this float is located the cylinders B, here shown as four in number, but which may be of a greater number.

C is a weight mounted upon a ball D, which in turn is fitted upon the ball-bearings E in the weight, so that the latter may move easily in any direction.

F represents piston-rods leading to the pistons of the cylinders, the outer ends of which rods are provided with the heads G, adapted to bear against and slide in contact with seats in the weight, and these heads are pinned to the weight by the pins H, passing through the slots I. From this arrangement it will be seen that the movement of the weight in any direction will force one or the other or, in some cases, two of the piston-rods backward within their cylinders, thus compressing air or pumping water, as the case may be.

A series of pipes J lead to the cylinders from the water, where water is to be elevated by the apparatus, or these pipes would be turned upward so as to take in air, where air was to be compressed, suitable check-valves K being located in the pipes to prevent the outward flow of the air or water when the pistons are moved backward. Also a series of pipes L lead from the cylinders to the delivery-pipe M, and this last-named pipe is connected with a flexible pipe N, by which the water or air may be conveyed to any suitable reservoir or shore, a check-valve O being provided for preventing the backflow of air or water, or, if found necessary, said check-valve may be located in each of the pipes L.

In operation the float is suitably anchored so as to have free oscillation, and the waves coming in any direction will oscillate this float and by so doing will cause the weight to move upon said float, thus forcing some of the piston-rods inward and drawing others outward, and those that are forced inward will force the air or water from the cylinders from the delivery-pipes M and N to the reservoir, and those that are drawn outward will draw in a fresh supply of air or water to be delivered when the weight moves in the proper direction, and by this oscillation of the float a continuous flow of air or water will be effected, and the water thus elevated or the air thus compressed can thereafter be used for running suitable motors to perform work.

In the modification shown in Fig. 4 I pivot the cylinders B upon the float, as indicated at P, and connect them by flexible couplings Q to the intake-pipes, and by similar couplings to the delivery-pipes, and in this construction the piston-rods are connected directly to the weight, so that when the weight is oscillated the cylinders will swing upon their pivoted point in unison therewith.

Having thus fully described my invention, what I claim as new and useful is—

1. An apparatus for generating power from wave motion, a float, cylinders located upon said float, pistons adapted to slide within the cylinders, piston-rods connected with said piston, a weight adapted to move in any direction upon the float, the outer ends of piston-rods being connected with said weight so as to receive motion therefrom when said weight is oscillated, intake-pipes leading to the cylinders, check-valves located in the intake-pipes, delivery-pipes leading from the cylinders, check-valve for preventing the backward movement of the fluid forced through the cylinders, and a flexible pipe for connecting the delivery-pipes to a suitable reservoir, as specified.

2. In an apparatus for generating power from wave motion, a float having a rounded bottom, four pump-cylinders located upon said float, pistons leading from said cylinders, heads carried by the outer ends of the pistons, a weight having concaved bearings therein in which the heads are fitted, means for conveying fluid to the pump-cylinders, and means for conveying said fluid from the cylinders, as specified.

3. In combination with a weight of the character described, four pump-cylinders located thereon, a weight, a bar upon which said weight is supported, ball-bearings by which the friction between the weight and the bar is lessened, and piston-rods leading from the pump-cylinders and connected with said weight, as and for the purpose set forth.

4. In an apparatus for generating power from wave motion, a float, cylinders carried by said float, pistons adapted to slide within said cylinders, piston-rods attached to said pistons, and a weight adapted to actuate said rods.

In testimony whereof I have hereunto affixed my signature in the presence of two subscribing witnesses.

JOHN A. McMANUS.

Witnesses:
MARY E. HAMER,
S. S. WILLIAMSON.